US011320720B2

(12) United States Patent
Puckett et al.

(10) Patent No.: US 11,320,720 B2
(45) Date of Patent: May 3, 2022

(54) INTEGRATED PHOTONICS MODE SPLITTER AND CONVERTER

(71) Applicant: Honeywell International Inc., Morris Plains, NJ (US)

(72) Inventors: Matthew Wade Puckett, Phoenix, AZ (US); Chad Fertig, Bloomington, MN (US); Steven Tin, Edina, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/803,820

(22) Filed: Feb. 27, 2020

(65) Prior Publication Data

US 2021/0116783 A1 Apr. 22, 2021

Related U.S. Application Data

(60) Provisional application No. 62/924,058, filed on Oct. 21, 2019.

(51) Int. Cl.
*G02F 1/365* (2006.01)
*G02F 1/35* (2006.01)
*G02F 1/355* (2006.01)

(52) U.S. Cl.
CPC ............ *G02F 1/365* (2013.01); *G02F 1/3526* (2013.01); *G02F 1/3553* (2013.01); *G02F 1/3558* (2013.01)

(58) Field of Classification Search
CPC .................................................. G02F 1/3526
See application file for complete search history.

(56) References Cited

U.S. PATENT DOCUMENTS 3,891,302 A * 6/1975 Dabby ............... G02B 6/02066
385/37
5,185,828 A * 2/1993 van der Tol ............. G02B 6/14
385/28
(Continued)

FOREIGN PATENT DOCUMENTS

GB 2529228 A 2/2016
GB 2534917 A 8/2016
(Continued)

OTHER PUBLICATIONS

U.S. Patent and Trademark Office, "Ex Parte Quayle", U.S. Appl. No. 16/803,841, filed Feb. 3, 2021, pp. 1 through 13, Published: US.
(Continued)

*Primary Examiner* — Rhonda S Peace
(74) *Attorney, Agent, or Firm* — Fogg & Powers LLC

(57) ABSTRACT

Systems and embodiments for an integrated photonics mode splitter and converter are provided herein. In certain embodiments, a system includes a substrate having a first index of refraction. Additionally, the system includes a waveguide layer on the substrate, wherein the waveguide has a second index of refraction different from the first index of refraction. Also, the waveguide layer includes one or more mode splitters that receive at least one of a first photon in a first mode and a second photon in a second mode through an input port and provide one of the first photon through a first output port and the second photon through a second output port. The waveguide layer also includes a mode converter coupled to the second output of a mode splitter, wherein the mode converter receives the second photon through a port and outputs the second photon in the first mode through the port.

10 Claims, 9 Drawing Sheets

(56) References Cited

U.S. PATENT DOCUMENTS

| | | |
|---|---|---|
| 5,668,900 A | 9/1997 | Little et al. |
| 5,917,974 A | 6/1999 | Tavlykaev et al. |
| 6,169,466 B1 | 1/2001 | Goulouev |
| 6,198,863 B1 | 3/2001 | Lealman et al. |
| 6,535,656 B1 | 3/2003 | Noge et al. |
| 6,641,662 B2 | 11/2003 | Radojevic et al. |
| 8,098,969 B2 | 1/2012 | Tolstikhin et al. |
| 8,605,286 B2 | 12/2013 | Zhang et al. |
| 9,146,441 B2 | 9/2015 | Smith et al. |
| 9,235,101 B2 | 1/2016 | Silverstone et al. |
| 9,264,148 B2 | 2/2016 | Smith et al. |
| 9,658,396 B2 | 5/2017 | Rong et al. |
| 9,857,534 B2 | 1/2018 | Kusaka et al. |
| 9,865,987 B1 | 1/2018 | Eichenfield et al. |
| 9,915,781 B1 | 3/2018 | Lin |
| 9,952,482 B2 | 4/2018 | Rudolph et al. |
| 9,967,637 B2 | 5/2018 | Brodsky et al. |
| 10,372,014 B1 | 8/2019 | Vidrighin et al. |
| 10,379,420 B1 | 8/2019 | Wang |
| 10,466,418 B2 | 11/2019 | Fanto et al. |
| 10,551,719 B2 | 2/2020 | Kim et al. |
| 10,788,340 B1* | 9/2020 | Tin .................. G01S 7/4811 |
| 10,801,840 B1 | 10/2020 | Solmeyer et al. |
| 2002/0044743 A1 | 4/2002 | Takeuchi et al. |
| 2003/0006866 A1 | 1/2003 | Yoneda et al. |
| 2003/0076200 A1 | 4/2003 | Fiedziuszko et al. |
| 2003/0081903 A1 | 5/2003 | Vahala et al. |
| 2004/0096142 A1 | 5/2004 | Noe et al. |
| 2005/0002597 A1 | 1/2005 | Penty et al. |
| 2005/0111079 A1 | 5/2005 | Wang et al. |
| 2006/0066421 A1 | 3/2006 | Lo Hine Tong et al. |
| 2008/0118202 A1 | 5/2008 | Kato et al. |
| 2008/0238577 A1 | 10/2008 | Guan |
| 2009/0080468 A1* | 3/2009 | Sumetsky .............. G02B 6/14 372/6 |
| 2017/0059779 A1* | 3/2017 | Okayama ............. G02B 6/124 |
| 2017/0075063 A1 | 3/2017 | Brouckaert et al. |
| 2017/0371105 A1 | 12/2017 | Marchildon et al. |
| 2018/0224613 A1 | 8/2018 | Goi et al. |
| 2018/0314004 A1 | 11/2018 | Fathpour et al. |
| 2019/0033520 A1 | 1/2019 | Lin et al. |
| 2019/0035422 A1 | 1/2019 | Harvey et al. |
| 2019/0067830 A1 | 2/2019 | Xu et al. |
| 2020/0401012 A1 | 12/2020 | Xu et al. |
| 2021/0116635 A1* | 4/2021 | Puckett .................... G04F 5/14 |
| 2021/0116639 A1* | 4/2021 | Fertig ............... G02B 6/12002 |

FOREIGN PATENT DOCUMENTS

| | | |
|---|---|---|
| WO | 2018051370 A1 | 3/2018 |
| WO | 2019018566 A1 | 1/2019 |

OTHER PUBLICATIONS

European Patent Office, "Extended European Search Report from EP Application No. 20199123.9", from Foreign Counterpart to U.S. Appl. No. 16/803,841, filed Mar. 16, 2021, pp. 1 through 8, Published: EP.

Hu et al., "A Polarization Splitter and Rotator Based on a Partially Etched Grating-assisted Coupler", IEEE Photonics Technology Letters, 2015, pp. 1041-1135, IEEE.

Okayama et al., "Polarization rotation Bragg grating using Si wire waveguide with non-vertical sidewall", Optics Express 31371, Dec. 15, 2014, pp. 1-8, vol. 22, No. 25, Optical Society of America.

Xu et al., "Compact silicon-based TM-pass/TE-divide polarization beam splitter using contra-directional grating couplers assisted by horizontal slot waveguide", Optics Communications 451, May 24, 2019, pp. 17-22, Elsevier.

Zhang et al., "High-extinction-ratio silicon polarization beam splitter with tolerance to waveguide width and coupling length variations", Optics Express 6586, Mar. 21, 2016, pp. 1-8, vol. 24, No. 6, Optical Society of America.

Zhu et al., "Polymeric multi-channel bandpass filters in phase-shifted Bragg waveguide gratings by direct electron beam writing", Optics Express 6372, Dec. 13, 2004, pp. 1-5, vol. 12, No. 25, Optical Society of America.

European Patent Office, "Extended European Search Report from EP Application No. 20199124.7", from Foreign Counterpart to U.S. Appl. No. 16/803,820, filed Mar. 24, 2021, pp. 1 through 10, Published: EP.

U.S. Patent and Trademark Office, "Notice of Allowance", U.S. Appl. No. 16/803,841, filed Apr. 6, 2021, pp. 1 through 13, Published: US.

U.S. Patent and Trademark Office, "Notice of Allowance", U.S. Appl. No. 16/803,841, filed Jun. 23, 2021, pp. 1 through 13, Published: US.

* cited by examiner

INTEGRATED PHOTONICS MODE SPLITTER AND CONVERTER

CROSS-REFERENCE TO RELATED APPLICATION

This application claims the benefit of U.S. Provisional Application Ser. No. 62/924,058, filed Oct. 21, 2019, and titled "INTEGRATED PHOTONICS SOURCE AND DETECTOR OF ENTANGLED PHOTONS," which is hereby incorporated herein by reference.

BACKGROUND

Networks of synchronized atomic clocks are frequently used to distribute accurate time across distances. For example, the global navigation satellite systems (GNSS) such as the global position system (GPS), GLONASS, BeiDou, and Galileo are comprised of satellites with synchronized atomic clocks and provide the distribution of international time. Often, satellites are equipped with hardware to facilitate the synchronization of clocks on separate satellites. Synchronization hardware of reduced size and weight, and capable of high precision timing alignment, permits synchronizing of atomic clocks of smaller satellites.

SUMMARY

Systems and embodiments for an integrated photonics mode splitter and converter are provided herein. In certain embodiments, a system includes a substrate having a first index of refraction. Additionally, the system includes a waveguide layer on the substrate, wherein the waveguide has a second index of refraction different from the first index of refraction. Also, the waveguide layer includes one or more mode splitters that receive at least one of a first photon in a first mode and a second photon in a second mode through an input port and provide at least one of the first photon through a first output port and the second photon through a second output port. The waveguide layer also includes a mode converter coupled to the second output of a mode splitter in the one or more mode splitters, wherein the mode converter receives the second photon through a port and outputs the second photon in the first mode through the port.

DRAWINGS

Understanding that the drawings depict only some embodiments and are not therefore to be considered limiting in scope, the exemplary embodiments will be described with additional specificity and detail using the accompanying drawings, in which.

Figure 1:
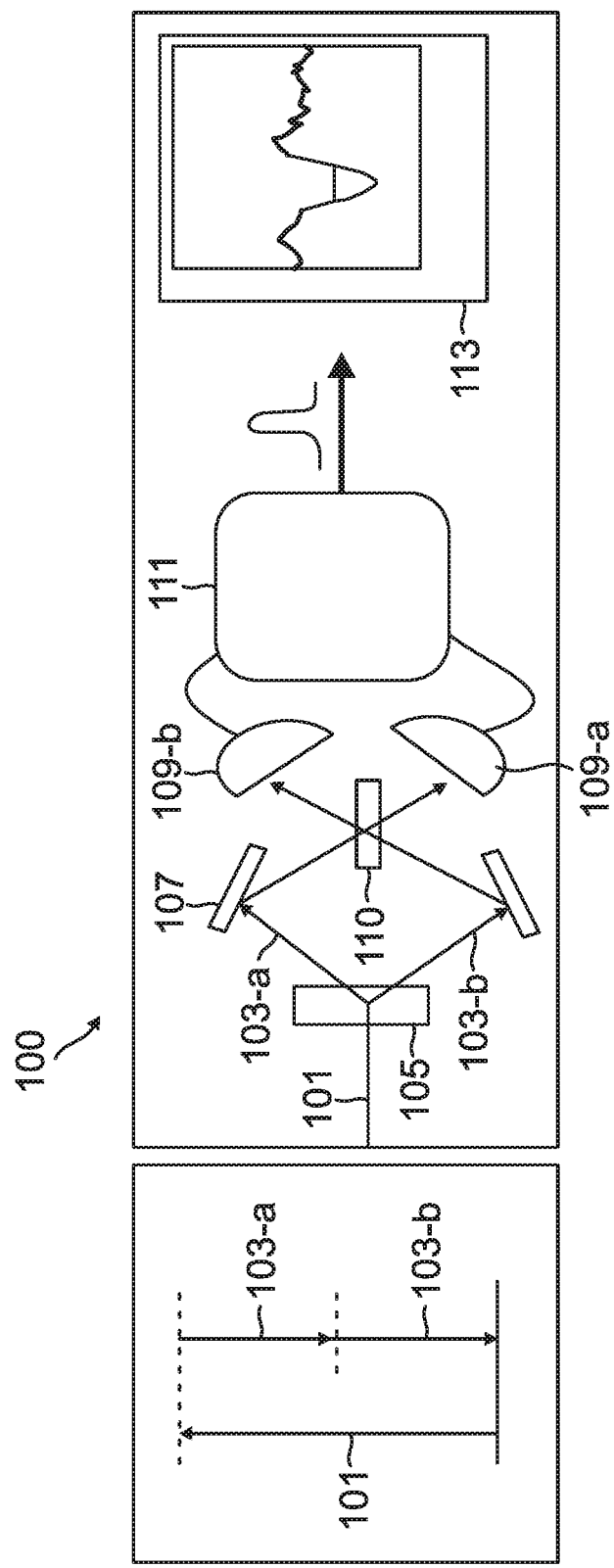
FIG. 1 is a block diagram illustrating an exemplary interferometer according to an aspect of the present disclosure.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Systems and methods for an integrated photonics source and detector of entangled photons are provided herein. In certain embodiments, hardware is described herein that enables methods for precise and secure synchronization of optical atomic clocks using the quantum interference of time-entangled photons. For example, the optical atomic clocks on orbiting satellites may be precisely and securely synchronized. Deployed across a swarm of LEO/MEO satellites, embodiments described herein may enable improved modalities of signal intelligence based on the coherent combination of distributed radio or optical apertures, including real-time computational interferometry for increased sensitivity to weak signals, and active beam forming radar/imaging for increased covertness by reducing both signal spillover and time-on-target.

Additionally, clock synchronization schemes, described herein, may use a chip-scale, ultra-high-flux source and interferometer for time-energy entangled bi-photons, with a reduced size, weight, and power, high pair production rate, and high flux-to-background ratio for entangled photon pairs. Also, for increased size, weight, and power reduction and improved deployability in small satellite platforms, devices described herein may be integrated onto a chip. In particular, both a photon source and interferometric detector may be integrated onto a chip.

In certain embodiments, entangled photons may be generated through a spontaneous parametric degenerate down-conversion of pump photons, also known as degenerate difference frequency generation. Typically, the above method for photon generation may yield entangled photons that have orthogonal polarizations to one another. Typically, free-space optics are used to separate the entangled photons and convert them into the same polarization state for use within a clock synchronization scheme. Embodiments described herein provide a chip-scale photonic integrated circuit having on-chip guided wave photonics for separating the entangled photons and converting the separated photons into the same polarization state.

In some embodiments, a chip-scale photonic integrated circuit may produce and interfere time-entangled photons. The chip-scale photonic integrated circuit may realize the optical functions for producing and interfering the photons on a hybrid optical waveguide platform which combines the nonlinear properties of periodically poled potassium titanyl phosphate (ppKTP) waveguides or waveguides made from similar material to ppKTP with the low transmission loss, high confinement, and filtering capabilities of silicon nitride waveguides or other waveguides made from similar material to silicon nitride. The chip-scale approach using the combination of waveguides made from different materials enable improvements over previous types of sources based in fiber and free-space optics.

In some embodiments, materials that have both nonlinear properties and low transmission loss, high confinement, and filtering capabilities could be used to implement similar optical functions for producing and interfering the photons in an optical waveguide platform based on a single material system, such as lithium niobate.

In certain embodiments, the optical functionality for producing and receiving entangled photons is implemented on a single, integrated platform, yielding reduced optical losses, enhanced mode overlap, efficient filtering of photons, increased interferometer contrast, and improved mechanical robustness, all while reducing size, weight, and power when compared to fiber or free space based systems. Additionally, embodiments described herein permit higher precision time synchronization when used in a system while enabling usage on smaller satellite platforms, such as microsats.

FIG. 1 is a diagram illustrating a system 100 for a Hong-Ou-Mandel (HOM) interferometer. As used herein, the chip scale integrated circuit may be used within a HOM interferometer. As used herein, a HOM interferometer is a device that may produce a pump photon 101. The system 100 may split the pump photon into two daughter photons 103 (referred to separately herein as photons 103-A and 103-B). For example, the pump photon 101 may be produced by a laser source that produces a laser having a wavelength of 405 nm or other desired wavelength.

In certain embodiments, the pump photon 101 is split into daughter photons 103 that are guided through optical structures for recombination. For example, the pump photon 101 is split by optical structure 105 into daughter photons 103-a and 103-b. The daughter photons 103 may each have a wavelength that is twice the wavelength of the pump photon 101 (i.e., where the pump photon 101 could have a wavelength of 405 nm, the daughter photons 103 may each have a wavelength of 810 nm). Additionally, the system 100 may include guiding optics 107 that guide the daughter photons 103 to beamsplitter 110, upon which the daughter photons 103 are combined, such that quantum superpositions 103-c and 103-d of the daughter photons impinge on detectors 109 for reception. For example, a detector 109-a may receive and detect the daughter photon 103-a and the detector 109-b may receive and detect the daughter photon 103-b; or detector 109-a may receive and detect the daughter photon 103-b and the detector 109-b may receive and detect the daughter photon 103-a or detector 109-a may receive and detect both daughter photons 103-a and 103-b; or detector 109-b may receive and detect both daughter photons 103-a and 103-b, in the manner of a HOM interferometer.

In some embodiments, when the detectors 109 receive the associated daughter photons 103, the detectors 109 may provide the signals to an electronic correlator device 111, where the electronic correlator device 111 combines the electrical signals of the two detectors 109 for the performance of HOM interferometry. The electronic correlator device 111 quantitively determines the degree of temporal correlation of the signals produced by the detectors 109. For example, the electronic correlator 111 may show that the coincidence rate of the signals provided by the photodetectors 109 may drop towards zero when the daughter photons 103 overlap substantially perfectly in time. This drop towards a zero rate of coincident detections is known as the HOM dip illustrated in the trace graph 113. The dip occurs when the two daughter photons 103 are substantially identical in all properties. When the photons 103 become distinguishable, including and especially in regards to the equality of their times-of-flight between the source region 105 and the beam splitter 110, the HOM dip disappears. In this way the system 100 is sensitive to the quality of the times-of-flight of the daughter photons 103 between the source region 105 and the beam splitter 110 being substantially perfectly equal.

Figure 2:
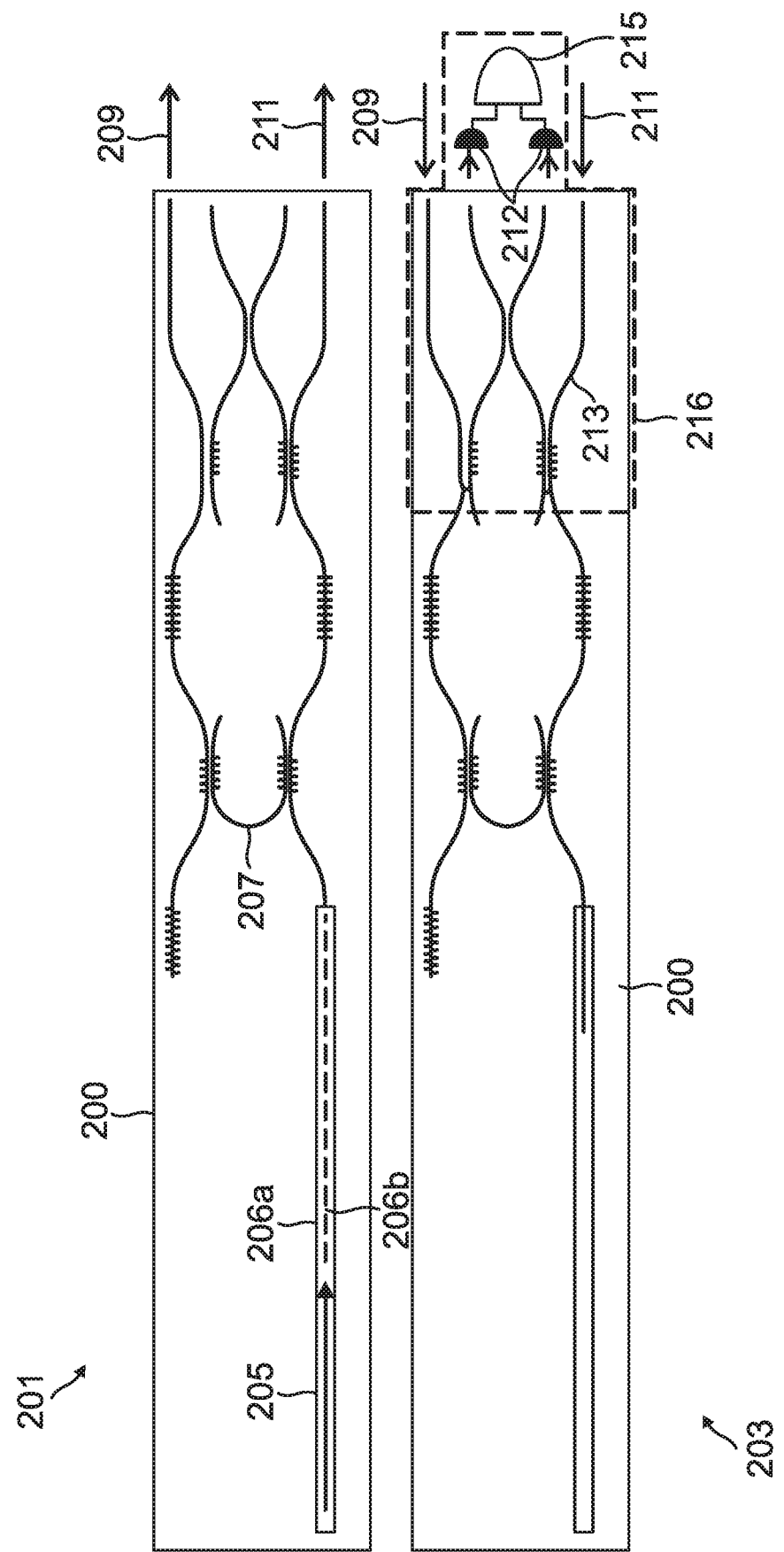
FIG. 2 is a diagram illustrating different paths in a chip-scale device according to an aspect of the present disclosure.

FIG. 2 illustrates different optical paths 201 and 203 on a chip-scale device 200 that is both capable of generating a photon, splitting the photon into daughter photons, providing the daughter photons as outputs (such as into free space or optical fibers), receiving the daughter photons which may have been reflected from remote mirrors or optical systems, and providing the received photons to an interferometer for performing HOM interferometry. As shown, FIG. 2 illustrates a source path 201 and an interferometer path 203. In the source path 201, an incoming pump photon is split into daughter photons which may be separated and directed to different remote platforms. In the interferometer path 203, the daughter photons reflected by the remote platforms are received and interfered in the manner of HOM interferometry.

In certain embodiments, the chip-scale device 200 utilizes the nonlinear optical effect of degenerate spontaneous parametric down conversion (dSPDC), in which a pump photon 205 splits into two "twin" daughter photons 209 and 211 that are "born" at nearly the same instant (e.g., within <100 femtoseconds of one another). This simultaneity, enforced by quantum mechanics, may be exploited for synchronizing separated atomic clocks. To synchronize the separated atomic clocks, (i.e., when the different atomic clocks are located on different satellites) the synchronization is achieved by projecting daughter photons 209 and 211 from the chip-scale device 200, reflecting some of the photons 209 and 211 from each of the satellites, and providing them for recombining in a Hong-Ou-Mandel (HOM) interferometer 215, in which a purely quantum mechanical interference "dip" in the coincidence rate is observed only when the paths are substantially exactly equal as described above with respect to FIG. 1. The arrival times of some of the entangled photons from each satellite may be compared over a classical channel, enabling controllers to synchronize the clocks with great precision (i.e., potentially with femtosecond precision).

In some embodiments, the chip scale device 200 is a chip-scale photonic integrated circuit that produces and interferes time-entangled photons. The chip-scale device 200 may include optical functions and components on a hybrid optical waveguide platform which combines the nonlinear properties of ppKTP waveguides (or other waveguides made from materials having similar properties) with the high confinement and filtering capabilities of silicon nitride waveguides. This combination permits miniaturization, efficiency, robustness, while increasing the usable flux of twin-photons 209 and 211.

In some embodiments, the chip-scale device 200 may include optical functions and components on a single optical waveguide material platform that has both nonlinear properties and low transmission loss, high confinement, and filtering capabilities, such as lithium niobate.

In certain embodiments, the chip scale device may generate a pump photon 205, and from the pump photon 205 in the source path 201, and may generate, by dSPDC, daughter photons 206a and 206b in the photon producing waveguide. Each of the twin photons 206a and 206b may occupy a different waveguide mode, either Transverse Electric (TE), or Transverse Magnetic (TM). A Vertical Coupler (VC) region may adiabatically draw the daughter photons 206a and 206b out of the photon producing waveguide and into a photon conditioning waveguide patterned on top of the photon producing waveguide. Additionally, the TM and TE photons may be separated by two diffractive waveguide mode splitters (MS). The TE photon may then pass through a bandpass filter (BPF) to reject background photons, through a second MS, then may leave the chip 200 as emitted photon 211. Meanwhile, the original TM photon may be converted into a TE mode by a diffractive mode converter (MC), which may also reverse the direction of propagation of the photon. This (now TE polarized) photon may pass through its own bandpass filter and leave the chip 200 as emitted photon 209. The various functions performed on the chip may be performed by a photon conditioning waveguide (in some embodiments, made from silicon nitride or other similar material), where waveguide structures are patterned in a film deposited on top of the substrate containing the photon producing waveguide.

In additional embodiments, the interferometer path 203. the twin-photons 209 and 211 may be reflected or sent back from remote satellites or other remote systems and are recoupled into the photonics component waveguides on the chip-scale device 200 to complete an HOM interferometer 215. (In some implementations, the photons may also have their polarizations rotated by 90 degrees by conventional waveplates). Although the twin photons 209 and 211 may re-enter the same waveguides from which they were earlier emitted, because of their now rotated polarizations, they may couple into the orthogonal waveguide mode (i.e., TM). Each photon then may interact with a diffractive mode splitter (MS) that may reverse the direction of propagation in the waveguide, sending the photons 209 and 211 to the 50/50 waveguide coupler. The output ports of the interferometer may be directed onto photon detectors 212, such as single-photon avalanche photodetectors (SP-APDs), where the photons 209 and 211 may be detected. The detected signal outputs of the photon detectors 212 may be directed to an electronic correlator 215, which may determine the degree of coincidence of the arrive times of the signals, thus completing an HOM interferometer 216.

Figure 3A:
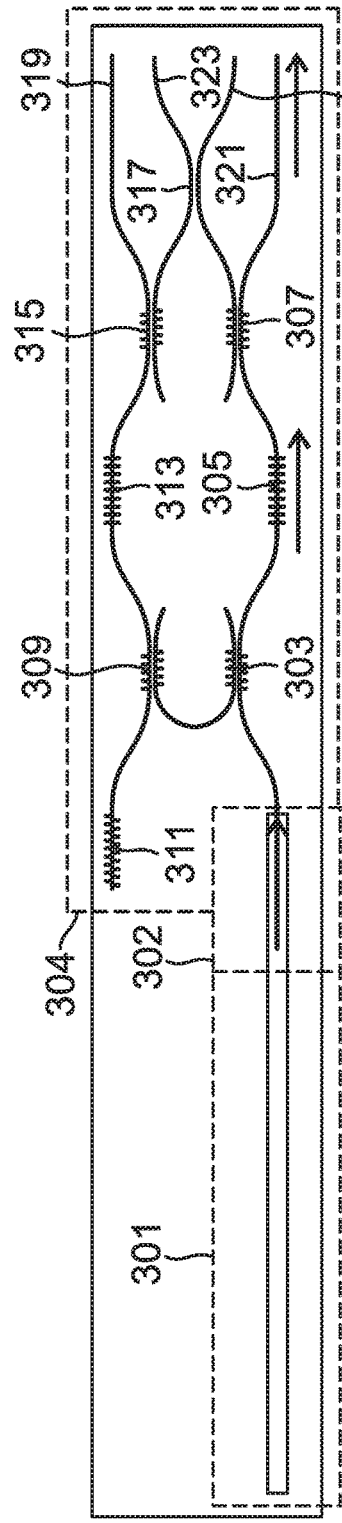
FIGS. 3A-3C are diagrams showing the paths through the chip-scale device for the different modes according to an aspect of the present disclosure.
Figure 3B:
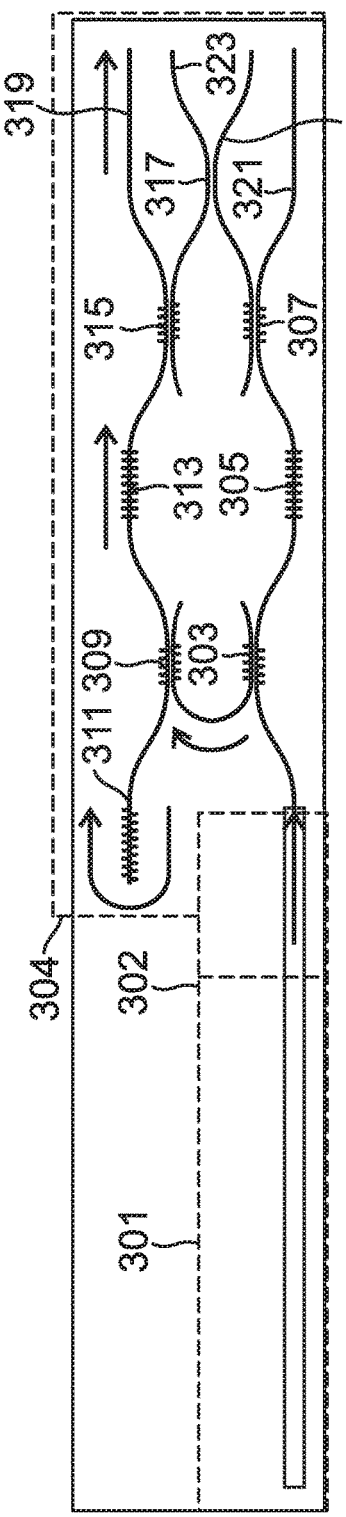
Figure 3C:
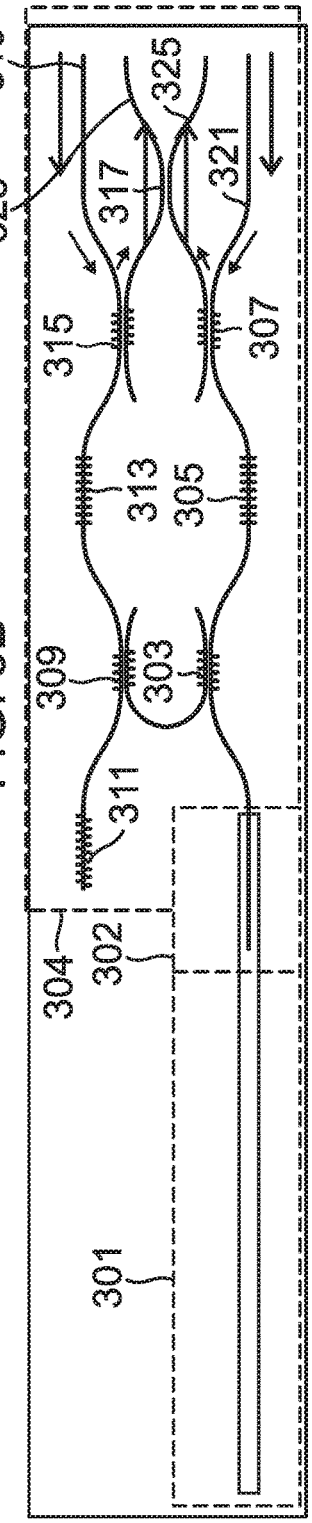

FIGS. 3A-3C illustrate the propagation of the two photons produced by the photon producing waveguide, into a photon vertical coupling waveguide, and through the photon conditioning waveguide network. As discussed above, the photon producing waveguide produces two photons having orthogonal waveguide modes: one mode propagating in the TM mode and the other propagating in the TE mode. Depending on the mode of the photon, the photons propagate along different paths through the waveguide network, such that the waveguide network provides two photons propagating in the TE mode off of the chip and receives two photons back onto the chip, propagating in the TM mode. FIG. 3A illustrates the path of the photon originally in the TE mode of the photon vertical coupling waveguide 302. FIG. 3B illustrates the path of the photon originally in the TM mode of the photon vertical coupling waveguide 302. FIG. 3C illustrates the path of the photons through the photon conditioning waveguide network 304 that are received from external devices.

In certain embodiments illustrated in FIG. 3A, the photon in the TE mode of the photon vertical coupling waveguide 302, passing into the photon conditioning waveguide network 304, passes through a mode splitter 303 without diffraction. Then the photon passes through a bandpass filter 305, which filters out fluorescence, as well as stray pump light coupled from the photon producing waveguide 301. The photon then passes through the mode splitter 307 without diffraction and is emitted through the output port 321.

In certain embodiments illustrated in FIG. 3B, the photon in the TM mode of the photon vertical coupling waveguide 302, passing into the photon conditioning waveguide network 304, is diffracted by the mode splitter 303. The photon is further diffracted by the mode splitter 309, whereupon the photon enters the mode converter 311. The mode converter 311 again diffracts the photon but converts the photon from the TM mode into the TE mode. As the photon is now in the TE mode, the photon is not diffracted by the mode splitter 309. The photon then passes through the bandpass filter 313, which filters out fluorescence, as well as stray pump light coupled from the photon producing waveguide. The photon then passes through the mode splitter 315 without diffraction and is emitted through the output port 319.

In additional embodiments illustrated in FIG. 3C, the two daughter photons emitted from the photon conditioning waveguide network 304 may be sent back from another optical device such that they are recoupled into the photon conditioning network 304 in TM modes at the waveguides 319 and 321. The two received photons in the TM modes may propagate into the waveguides to the mode splitters 315 and 307 respectively. Both mode splitters 315 and 307 diffract the received photons. The photons then are interfered with one another via a 50/50 coupler 317 before being output on ports 323 and 325 for subsequent detection by photon detectors. In embodiments discussed above, the TM mode from the photon vertical coupling waveguide 302 is converted by the photon conditioning waveguide network 304 into a TE mode for transmission out of the chip-scale device, while the light received back into the device for subsequent interferometric detection is in the TM mode. However, in another embodiment, the TE mode from the photon vertical coupling waveguide is converted by the photon conditioning waveguide network 304 into a TM mode for transmission out of the chip-scale device, while the light received back into the device for subsequent interferometric detection is in the TE mode.

Figure 4:
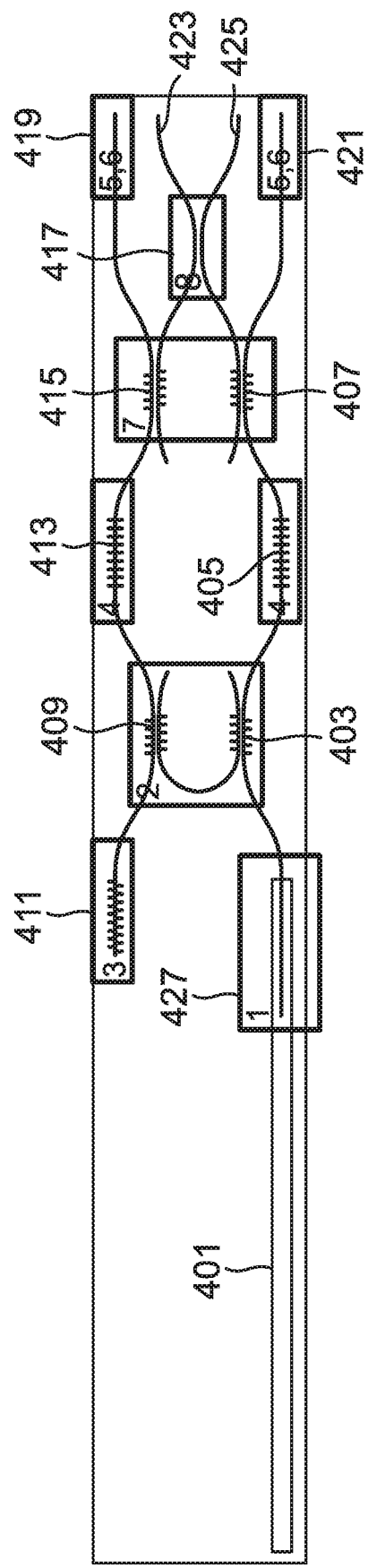
FIG. 4 is a diagram illustrating the various components in a chip-scale device according to an aspect of the present disclosure.

FIG. 4 illustrates the different photonics components within the chip-scale device 400. For example, the chip scale device 400 includes a photon producing waveguide 401, a photon vertical coupling waveguide 427; and a photon conditioning waveguide network (similar to the photon conditioning waveguide network 304 in FIGS. 3A-3C) comprising mode splitters, 403, 409, 407, and 415; mode converter 411; bandpass filters 413 and 405; input/output waveguides 419, 421, 423, and 425; and 50/50 coupler 417. Possible embodiments for the vertical coupler 427; mode splitters 403, 409, 407, and 415; mode converter 411, and bandpass filters are described in greater detail below.

Figure 5:
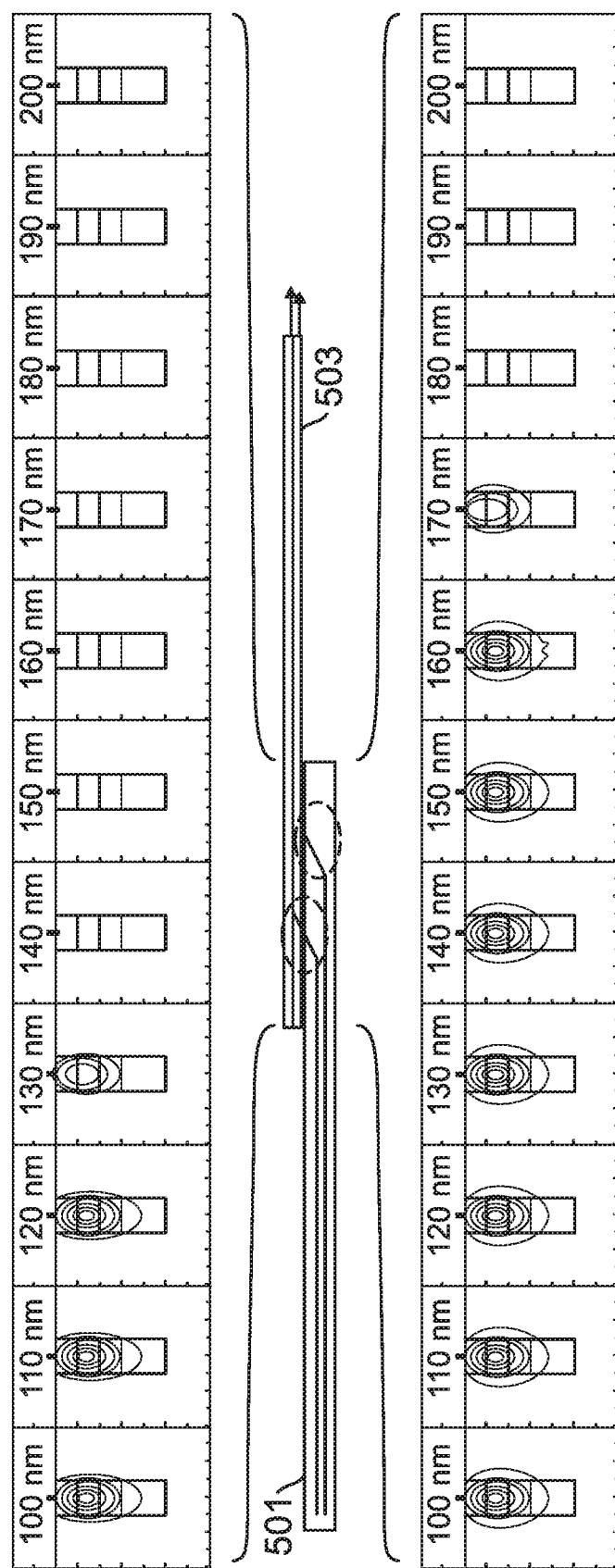
FIG. 5 is a diagram illustrating a vertical coupler according to an aspect of the present disclosure.

FIG. 5 is a side view diagram illustrating the operation of a vertical coupler. To efficiently couple photons out of photon producing waveguide 501 into the photon vertical coupling waveguide 503, a stacked waveguide is formed. Further, a relatively thin photon vertical coupling waveguide 503 in relation to the width of the photon producing waveguide 501 has little perturbation on the shape of the weakly confined modes in the photon producing waveguide 501. As discussed herein, the photon vertical coupling waveguide 503 is gradually widened throughout the overlapping portions of the stacked waveguide. For example, the photon vertical coupling waveguide 503 may widen from 100 nm to 200 nm over a distance of ~500 microns. The gradual widening of the photon vertical coupling waveguide 503 adiabatically draws the photons from the photon producing waveguide 501 into a much more tightly confined waveguide mode. Additionally, the transfer preserves the polarization modes of the propagating photons (i.e., TE→TE, and TM→TM), with essentially zero mode cross-coupling.

In further embodiments, the material used to produce the photon producing waveguide and the material used to produce the photon vertical coupling waveguide may have a large difference between their respective indexes of refraction. For example, where KTP is used for the photon producing waveguide, the photon vertical coupling waveguide may be made using silicon enriched nitride films.

Figure 6:
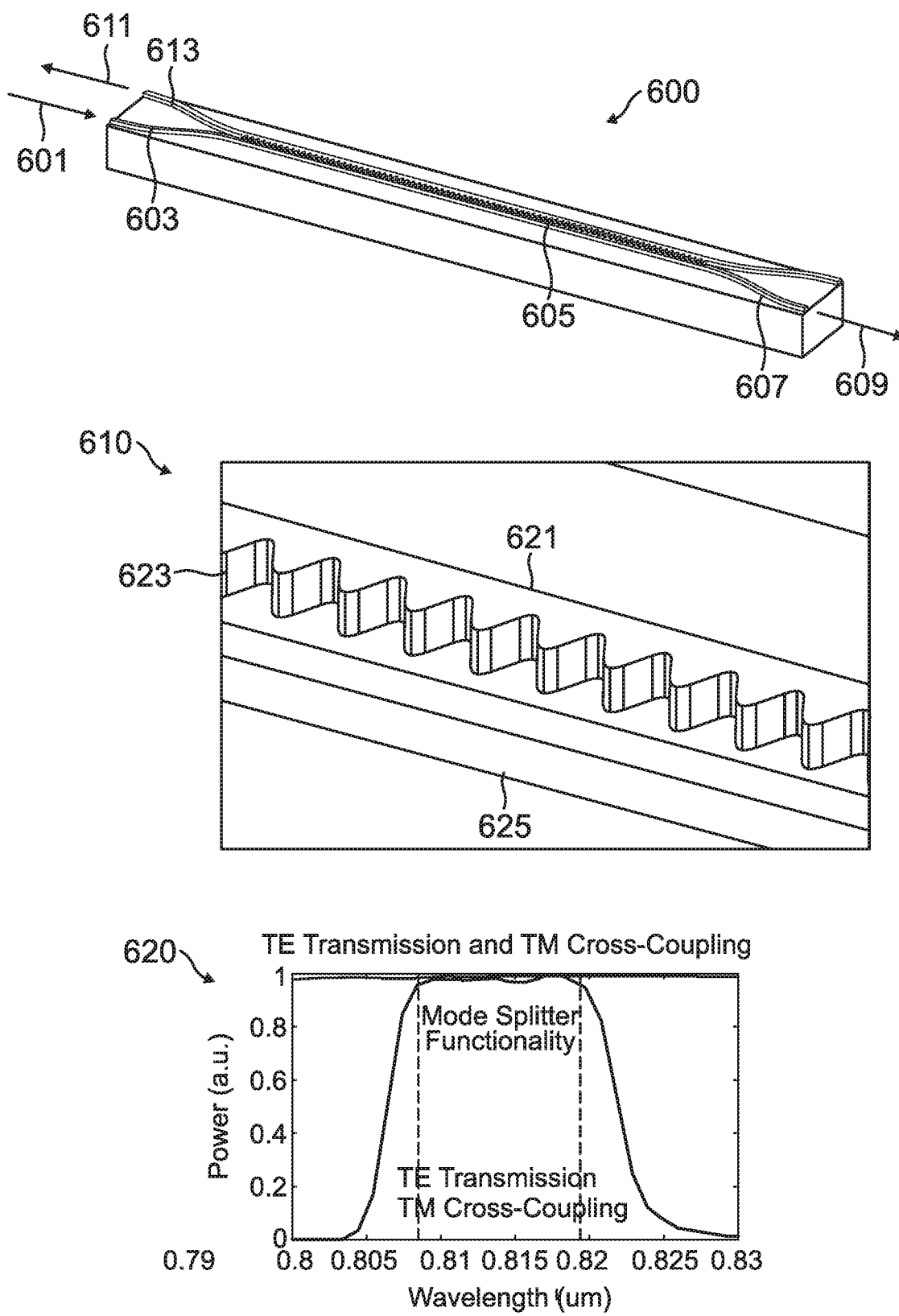
FIG. 6 is a diagram illustrating a mode splitter according to an aspect of the present disclosure.

FIG. 6 is a diagram illustrating certain aspects of a mode splitter as found in the chip-scale device 200. In particular, FIG. 6 shows an isometric view 600 of a mode splitter, a detailed isometric view 610 of a portion of the mode splitter, and a frequency response graph 620 of the coupling of the different modes within the mode splitter.

In certain embodiments, as shown in the isometric view 600, the mode splitter may include a single input port 603. Through the input port the mode splitter may receive two photons as an input 601 that are propagating in different orthogonal modes within the waveguide. For example, one photon may be propagating in the TE mode and another photon may be propagating in the TM mode. The mode splitter may pass one of the received photons at the input port 603 through to the output port 607 as an output photon 609. For example, the mode splitter may pass the TE mode photon received at the input port 603 directly through to the output port 607. Additionally, the mode splitter may diffract one of the propagating photons so that one of the propagating photons is coupled into a contra-directional waveguide and passed through to the output port 613 as output 611. For example, the TM mode may be diffracted by a coupling portion 605 of the mode splitter and passed to the output port 613.

In some embodiments, as shown in the detailed isometric view 610 of the coupling portion 605 of the mode splitter, to split the two orthogonally polarized photons into different paths, the mode splitter may include a chirped-grating-assisted contra-directional mode coupler. As shown, view 610 depicts the waveguide structure and graph 620 shows the results of a calculation of its spectral response. As shown, the coupling portion consists of two closely spaced waveguides 621 and 625. The waveguide 621 may further be patterned with a modulated sidewall 623, thus, creating an in-waveguide diffraction grating which has a large overlap integral for the TM-to-TM transition from one waveguide to the other. The effect of the modulation is to couple the TM mode from the forward direction in the waveguide 625 to the backward direction in the waveguide 621; whereas the TE mode passes through the mode splitter in the forward direction, remaining in waveguide 625. Additionally, the frequency of the modulated sidewall 623 may change along the length of the mode splitter, to allow for a desired frequency response for the mode splitter.

Figure 7:
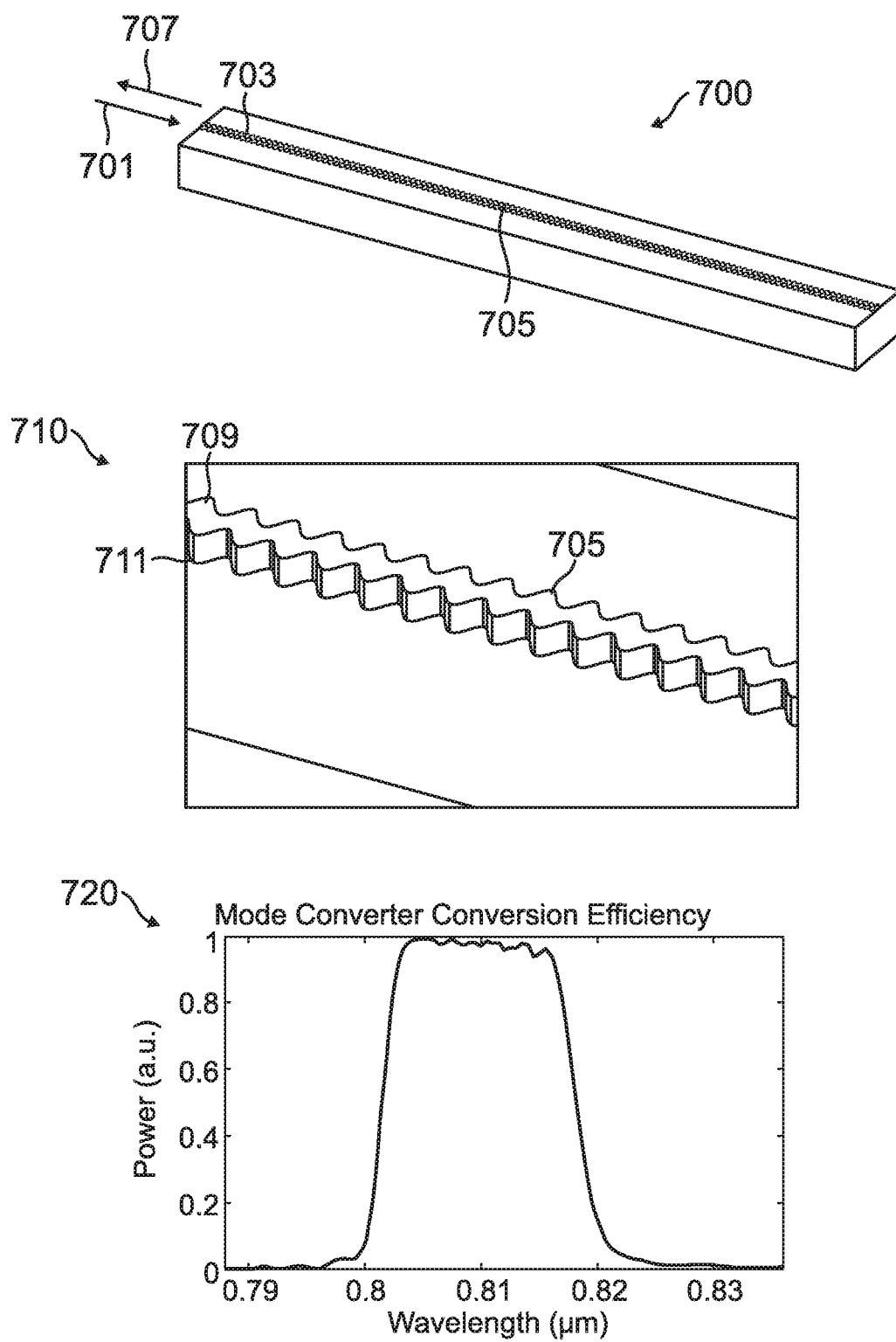
FIG. 7 is a diagram illustrating a mode converter according to an aspect of the present disclosure.

FIG. 7 is a diagram illustrating certain aspects of a mode converter as found in the chip-scale device 200. In particular, FIG. 7 shows an isometric view 700 of a mode splitter, a detailed isometric view 710 of a converting portion of the mode splitter, and a frequency response graph 720 of the conversion of the modes within the mode converter.

In certain embodiments, as shown in the isometric view 700, the mode converter may include a single port 703. Through the port 703 the mode converter may receive a photon as an input 701 that is propagating in a particular mode within the waveguide. For example, the photon received through the port 703 may be propagating in the TM mode. The mode converter may convert the mode from one mode into an orthogonal mode within a converting portion 705, where the mode converter converts the photon into an orthogonally propagating mode to be output through the port 703 as an output. For example, when the photon received on the port 703 is in the TM mode, the photon output through the port 703 may be in the TE mode.

In some embodiments, as shown in the detailed isometric view 710 of the converting portion 705 of the mode converter, to make all the waveguide paths as similar as possible for the two photons, the chip-scale device may flip the in-waveguide polarization of the TM photon using a single waveguide grating structure designed with asymmetrically modulated sidewalls 709 and 711. For example, the modulation of the sidewalls may be out of phase with each other such that the transverse cross-section of the waveguide along the length of the modulation is constant. This asymmetric modulation creates a cross coupling between the TM mode in the forward direction and the TE mode in the backward direction. As shown in the graph 720, mode conversion only occurs within the stopband of the grating. To control the stopbands of the grating, the length of the converting portion 705 may be changed along with the modulation frequency of the modulated sidewalls 709 and 711. For example, the frequency of the modulated sidewalls may either decrease or increase along the length of the converting portion of the mode converter.

Figure 8:
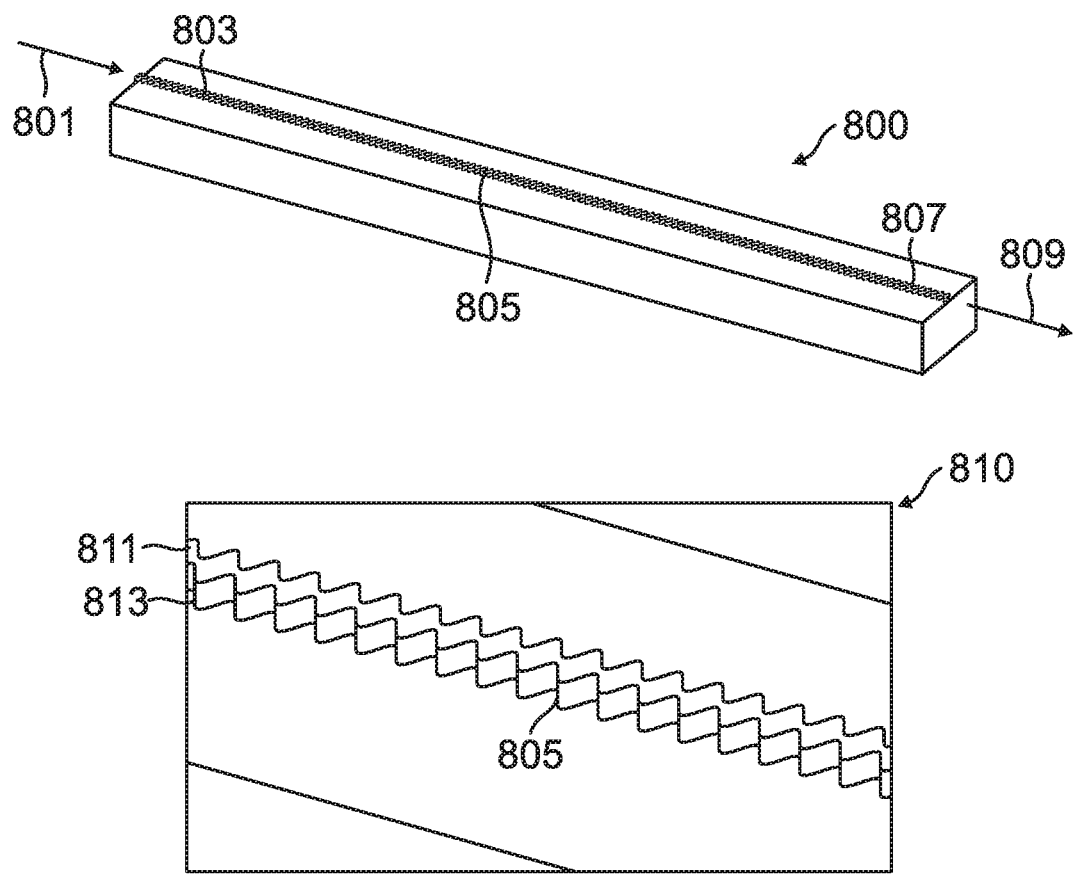
FIG. 8 is a diagram illustrating a bandpass filter according to an aspect of the present disclosure.
Figure 8:
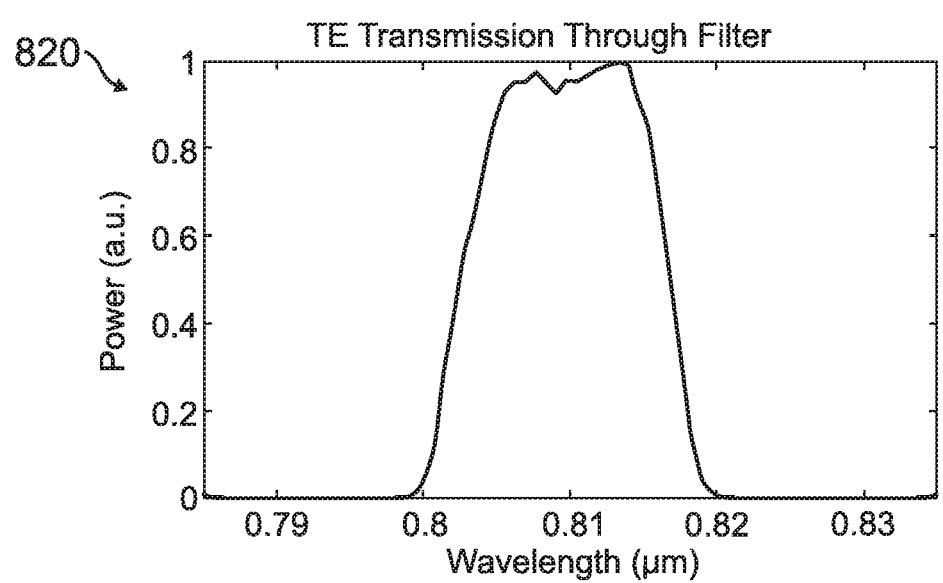

FIG. 8 is a diagram illustrating certain aspects of a bandpass filter as found in the chip-scale device 200. In particular, FIG. 8 shows an isometric view 800 of a bandpass filter, a detailed isometric view 810 of a filtering portion of the bandpass filter, and a frequency response graph 820 of the filtering of photons by the bandpass filter.

In certain embodiments, as shown in the isometric view 800, the bandpass filter may include a single port 803. Through the port 803, the bandpass filter may receive a photon as an input 801 that is propagating in a particular mode within the waveguide. For example, the photon received through the input port 803 may be propagating in the TE mode. The bandpass filter may filter photons having unwanted wavelengths in a filtering portion 805 and provide the filtered photons as output 809 through the output port 807.

In some embodiments, as shown in the detailed isometric view 810 of the filtering portion 805 of the bandpass filter, to reject any background fluorescence photons that may be propagating in the waveguides, as well as to reject any residual pump photons, a waveguide bandpass filter is implemented. As shown, the filter is made from two high reflectivity waveguide gratings 811 and 813 that manifest by a chirp in the modulation period along the length of the waveguide, in other words, the modulation of the waveguide gratings symmetrically, longitudinally varies along the length of the sidewalls of the filters. Light just outside of the passband is diffracted back down the waveguide, while light at the pump wavelength is scattered out of the waveguide entirely. In some embodiments the spectral location of the waveguide gratings 811 and 813 may change along the length of the filtering portion 805 of the passband.

Figure 9:
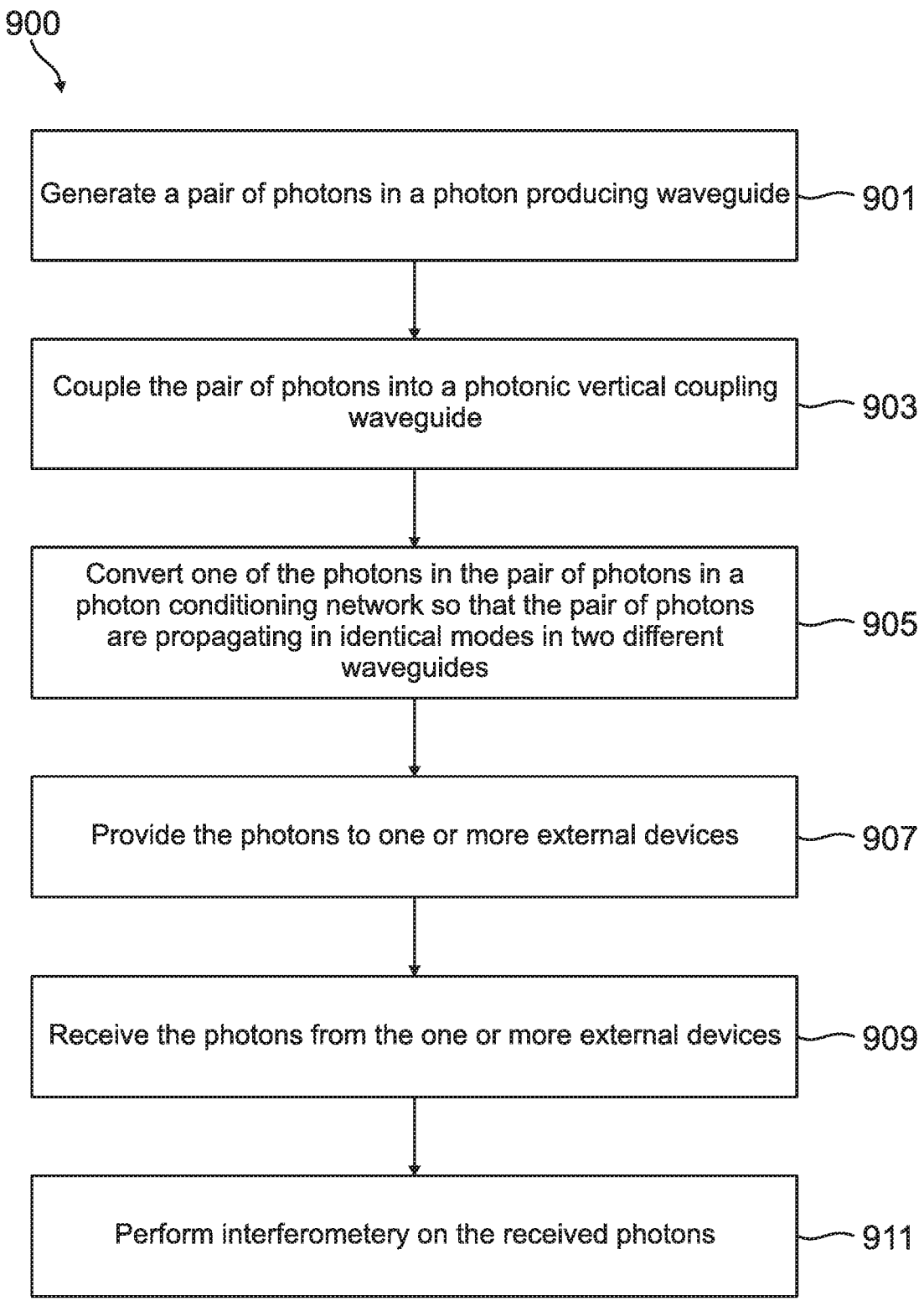
FIG. 9 is a flowchart diagram illustrating an exemplary method for using a chip-scale device to perform interferometry according to an aspect of the present disclosure.

FIG. 9 is a method 900 of using a chip-scale device to produce and interfere pairs of correlated photons, as described above. The method 900 proceeds at 901, where a pair of photons are generated in a photon producing waveguide. Additionally, the method 900 proceeds at 903, where the pair of photons is coupled into a photon vertical coupling waveguide. Further, the method 900 proceeds at 905, where one of the photons in the pair of photons is converted in a photon conditioning waveguide network so that photons are propagating in identical modes in two different waveguides. In certain embodiments, the method 900 proceeds at 907, where the photons are provided to one or more external devices. Further, the method 900 proceeds at 909, where the photons are received from the one or more external devices. Additionally, the method 900 proceeds at 911, where interferometry is performed on the received photons.

Example Embodiments

Example 1 includes a device comprising: an input port configured to receive a first photon propagating in a first mode and a second photon propagating in a second mode that is orthogonal to the first mode; a first output port; a second output port; a first waveguide coupled to the input port and the first output port, wherein the first waveguide receives the first photon and the second photon through the input port and provides the first photon to the first output port; and a second waveguide coupled to the second output port, wherein a wall of the second waveguide proximate to the first waveguide has a modulated sidewall and the second photon is coupled into the second waveguide and output through the second output port, wherein the first waveguide and the second waveguide are on a substrate of a first material and within a waveguide layer of a second material, where the first material and the second material have a different index of refraction.

Example 2 includes the device of Example 1, wherein the first material is periodically poled potassium titanyl phosphate.

Example 3 includes the device of any of Examples 1-2, wherein the first photon and the second photon are generated within the substrate layer.

Example 4 includes the device of any of Examples 1-3, wherein the second material is silicon nitride.

Example 5 includes the device of any of Examples 1-4, wherein the first photon and the second photon are entangled photons.

Example 6 includes the device of any of Examples 1-5, wherein the first mode is a TE mode and the second mode is a TM mode.

Example 7 includes a system comprising: a substrate layer having a first index of refraction; a waveguide layer formed on the substrate layer, the waveguide layer having a second index of refraction different from the first index of refraction, wherein the waveguide layer comprises: one or more waveguides formed therein, wherein at least one waveguide in the one or more waveguides comprises a modulated sidewall; and one or more ports for receiving one or more input photons and providing one or more output photons, where an output mode of the one or more output photons and a port in the one or more ports associated with the output photons is based on an input mode of the one or more input photons.

Example 8 includes the system of Example 7, wherein the one or more waveguides and the one or more ports form a mode splitter, the mode splitter comprising: a first waveguide in the one or more waveguides coupled to an input port and a first output port in the one or more ports, wherein the first waveguide receives a first photon and a second photon through the input port and provides the first photon to the first output port; and a second waveguide in the one or more waveguides coupled to a second output port in the one or more ports, wherein the second photon is coupled into the second waveguide and output through the second output port.

Example 9 includes the system of Example 8, wherein a wall of the second waveguide proximate to the first waveguide has a modulated sidewall.

Example 10 includes the system of any of Examples 7-9, wherein the one or more waveguides and the one or more ports form a mode converter, the mode converter comprising: a port in the one or more ports configured to receive a photon propagating in a first mode; and a waveguide coupled to the port that causes the photon to output through the port propagating in an orthogonal mode to the first mode.

Example 11 includes the system of Example 10, wherein the waveguide comprises a first periodically modulated sidewall and a second periodically modulated sidewall, wherein modulation of the first periodically modulated sidewall and the second periodically modulated sidewall are out of phase with one another such that a width of a transverse cross-section of the mode converting waveguide is constant along the length of the mode converting waveguide.

Example 12 includes a device comprising: a substrate having a first index of refraction; a waveguide layer on the substrate, the waveguide layer having a second index of refraction different from the first index of refraction, the waveguide layer comprising: a port configured to receive a photon propagating in a first mode; and a waveguide coupled to the port, the waveguide having a first periodically modulated sidewall and a second periodically modulated sidewall, wherein modulation of the first periodically modulated sidewall and the second periodically modulated sidewall are out of phase with one another such that a width of a transverse cross-section of the mode converting waveguide is constant along the length of the mode converting waveguide, wherein the first periodically modulated sidewall and the second periodically modulated sidewall cause the photon to output through the port propagating in an orthogonal mode to the first mode.

Example 13 includes the device of Example 12, wherein the first material is periodically poled potassium titanyl phosphate.

Example 14 includes the device of any of Examples 12-13, wherein the second material is silicon nitride.

Example 15 includes the device of any of Examples 12-14, wherein the first mode is a TE mode.

Example 16 includes a system comprising a substrate having a first index of refraction; and a waveguide layer on the substrate, wherein the waveguide layer has a second index of refraction different from the first index of refraction, the waveguide layer comprising: one or more mode splitters that receive at least one of a first photon in a first mode and a second photon in a second mode through an input port and provide at least one of the first photon through a first output port and the second photon through a second output port; and a mode converter coupled to the second output of a mode splitter in the one or more mode splitters, wherein the mode converter receives the second photon through a port and outputs the second photon in the first mode through the port.

Example 17 includes the system of Example 16, wherein a mode splitter in the one or more mode splitters comprises: a first waveguide coupled to the input port and the first output port; and a second waveguide coupled to the second output port, wherein the second photon is coupled into the second waveguide from the first waveguide and output through the second output port.

Example 18 includes the system of Example 17, wherein a wall of the second waveguide proximate to the first waveguide is a modulated sidewall.

Example 19 includes the system of any of Examples 16-18, wherein a mode converter in the one or more mode converters comprises a waveguide coupled to the port that causes the photon to output through the port propagating in the first mode.

Example 20 includes the system of Example 19, wherein the waveguide comprises a first modulated sidewall and a second modulated sidewall, wherein the first modulated sidewall is out of phase with the second modulated sidewall.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
a substrate layer having a first index of refraction; and
a waveguide layer formed on the substrate layer, the waveguide layer having a second index of refraction different from the first index of refraction, wherein the waveguide layer comprises:
one or more waveguides formed therein of a material having a third index of refraction, wherein at least one waveguide in the one or more waveguides comprises a modulated sidewall; and
one or more ports for receiving one or more input photons and providing one or more output photons, where an output mode of the one or more output photons and a port in the one or more ports associated with the one or more output photons is based on an input mode of the one or more input photons;
wherein the one or more waveguides and the one or more ports from a mode converter, the mode converter comprising:
the port in the one or more ports configured to receive a photon propagating in a first mode; and
a waveguide coupled to the port that causes the photon to output through the port propagating in an orthogonal mode to the first mode, wherein the waveguide comprises a first periodically modulated sidewall and a second periodically modulated sidewall, wherein modulation of the first periodically modulated sidewall and the second periodically modulated sidewall are out of phase with one another such that a transverse cross-sectional profile of the waveguide has a constant height and width along a length of the waveguide.

2. The system of claim 1, wherein the one or more waveguides and the one or more ports include additional ports and additional waveguides to form a mode splitter, the mode splitter comprising:
a first waveguide in the additional waveguides coupled to an input port and a first output port in the additional ports, wherein the first waveguide receives a first photon and a second photon through the input port and provides the first photon to the first output port; and
a second waveguide in the one or more waveguides coupled to a second output port in the one or more ports, wherein the second photon is coupled into the second waveguide and output through the second output port.

3. The system of claim 2, wherein a wall of the second waveguide proximate to the first waveguide is modulated.

4. A device comprising:
a substrate layer having a first index of refraction; and
a waveguide layer formed on the substrate layer, the waveguide layer having a second index of refraction different from the first index of refraction, wherein the waveguide layer comprises:
one or more ports for receiving one or more input photons and providing one or more output photons, where an output mode of the one or more output photons and a port in the one or more ports associated with the one or more output photons is based on an input mode of the one or more input photons, wherein the port receives a photon propagating in a first mode; and
one or more waveguides formed therein of a material having a third index of refraction, wherein at least one waveguide in the one or more waveguides comprises one or more modulated sidewalls, wherein a mode converting waveguide in the one or more waveguides is coupled to the port configured to receive a photon propagating in the first mode, the mode converting waveguide having a first periodically modulated sidewall and a second periodically modulated sidewall, wherein modulation of the first periodically modulated sidewall and the second periodically modulated sidewall are out of phase with one another such that a transverse cross-sectional profile of the mode converting waveguide has a constant height and width along a length of the mode converting waveguide, wherein the first periodically modulated sidewall and the second periodically modulated sidewall cause the photon to output through the port propagating in an orthogonal mode to the first mode.

5. The device of claim 4, wherein the substrate layer is formed from a first material that is periodically poled potassium titanyl phosphate.

6. The device of claim 4, wherein the waveguide layer is formed from a second material that is silicon nitride.

7. The device of claim 4, wherein the first mode is a TE mode.

8. A system comprising:
a substrate having a first index of refraction; and
a waveguide layer on the substrate, wherein the waveguide layer has a second index of refraction different from the first index of refraction with waveguides formed therein of a material having a third index of refraction, the waveguide layer comprising:
one or more mode splitters that receive at least one of a first photon in a first mode and a second photon in a second mode through an input port and provide at least one of the first photon through a first output port and the second photon through a second output port; and
a mode converter coupled to the second output port of a mode splitter in the one or more mode splitters, wherein the mode converter receives the second photon through a port and outputs the second photon in the first mode through the port,
wherein the mode converter comprises a waveguide coupled to the port that causes the second photon to output through the port propagating in the first mode, wherein the waveguide comprises a first modulated sidewall and a second modulated sidewall, wherein the first modulated sidewall is out of phase with the second modulated sidewall such that a transverse cross-sectional profile of the waveguide has a constant height and width along a length of the waveguide.

9. The system of claim 8, wherein the mode splitter in the one or more mode splitters comprises:
   a first waveguide coupled to the input port and the first output port; and
   a second waveguide coupled to the second output port, wherein the second photon is coupled into the second waveguide from the first waveguide and output through the second output port.

10. The system of claim 9, wherein a wall of the second waveguide proximate to the first waveguide is a modulated sidewall.

* * * * *